July 15, 1958 — E. R. CUNNINGHAM — 2,843,346
RESILIENT MOUNTING
Filed Sept. 20, 1956
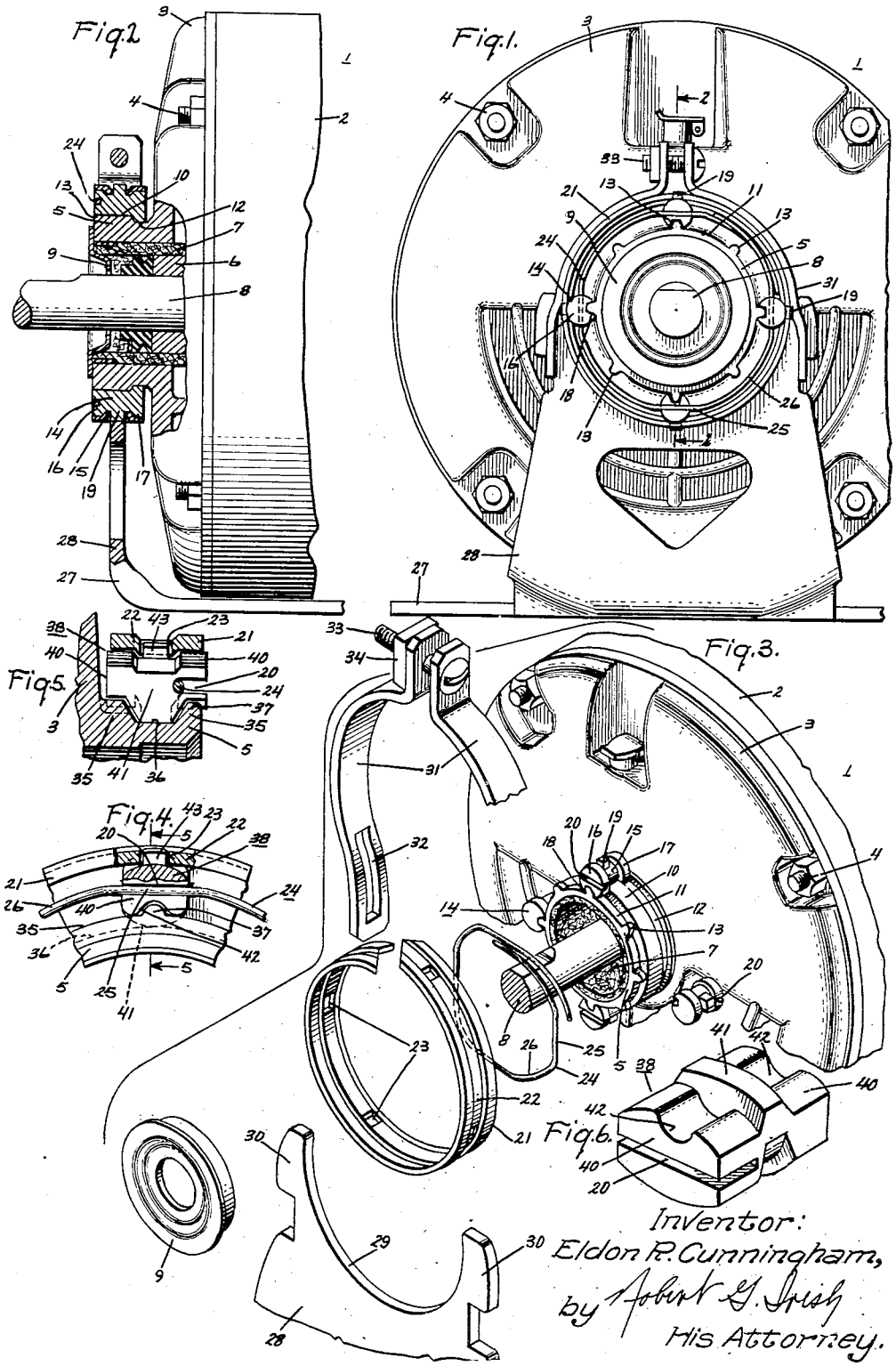
Inventor:
Eldon R. Cunningham,
by Robert G. Irish
His Attorney.

United States Patent Office 2,843,346
Patented July 15, 1958

2,843,346

RESILIENT MOUNTING

Eldon R. Cunningham, Fort Wayne, Ind., assignor to General Electric Company, a corporation of New York Application September 20, 1956, Serial No. 610,977

5 Claims. (Cl. 248—26)

This invention relates to machines having rotatable parts, and more particularly to resilient mounting means for such machines.

It is well known that it is most important, in machines having rotatable parts, to provide suitable means for isolating from the machine support the vibrations caused by the rotating part. Consequently, many different means of achieving this end have been devised; an early and well known means of effecting the purpose, for instance, was to provide springs between the machine and the support in very much the same manner that an automobile is mounted on its axles on springs. In the case of relatively small machinery, however, this type of arrangement has proved to be relatively expensive. A solution to the problem was set forth in Patent 2,074,136 issued on March 16, 1937 to A. F. Welch, and assigned to the assignee of the present application. This patent proposed the interposition of an annulus of resilient material between each hub of the machine and a support which engaged the hubs. By such a provision, the annulus of resilient material effected the desired purpose of isolating the major part of the vibrations of the machine from the support.

The cost of the Welch arrangement, while providing considerable economy with respect to previous constructions, has still left room for improvement; in particular, the requirement for an annulus of resilient material, preferably bonded to one or more metallic surfaces, has proved to be the expensive part of the construction and thus is the most susceptible to advantageous modification. Further, the fact that Welch uses a resilient material results in a yielding effect in response to axial and radial forces as well as those in torsion. However, the vibrations of the rotating machines generally result from torsional forces; a high degree of stiffness in the radial and axial directions is desirable to provide the necessary rigidity under radial and axial loads.

It is known that suitable configurations of relatively non-resilient material (such as metal) can provide a part which has resilience as a result of the configuration, and that such a part can be made stiff to certain directions of force and yielding to others. In the light of the low cost possible with metallic parts, it is most desirable to provide a type of construction similar to that of Welch utilizing exclusively relatively non-resilient materials to provide a resilient mounting arrangement.

It is, therefore, an object of this invention to provide improved resilient mounting means between the hub of a machine and the support therefore wherein the resiliency is obtained by the use of parts formed of relatively non-resilient materials such as metal.

It is a further object of this invention to provide an improved resilient mounting member which will retain all the desirable features of the construction of the aforesaid Welch patent without the use of resilient materials such as rubber.

Yet a further object is to provide a mounting of the Welch type which is resilient only in response to a predetermined direction of force and which has high stiffness to other forces.

In one aspect thereof, the invention provides means for resiliently mounting a machine having a rotatable member and a stationary member with a hub. The means include an annulus of relatively rigid material formed from a sheet or strip of the material and arranged with the width thereof substantially parallel to the axis of the machine. The annulus is positioned substantially concentric with the hub and outwardly spaced therefrom. A plurality of circumferentially spaced roller members of stiff material are positioned between the hub and the annulus; each roller member is in pivotable engagement with both the hub and the annulus on axes substantially parallel to the axis of the machine. In response to torsional forces, pivoting of each roller member will occur at both the hub and the annulus with the result that the annulus is free to move circumferentially relative to the hub. The roller members may be formed with a substantially elliptical cross section so that the greater the amount of pivoting, the greater the radial dimension of the roller member; such an arrangement provides yielding but increasing resistance of the annulus to torsional forces. On the other hand, a simple and more positive means of obtaining the desired spring effect is to use separate metallic spring means arranged in engagement with the roller members so as to oppose pivoting thereof.

The features of the invention which are believed to be novel are set forth with particularity in the appended claims. The invention itself however, together with further objects and advantages thereof may best be understood by reference to the following description taken in connection with the accompanying drawing.

In the drawing, Figure 1 is an end view of a machine having a rotatable part provided with the preferred embodiment of improved resilient mounting of this invention;

Figure 2 is a side view of the machine including a cross sectional view along line 2—2 in Figure 1;

Figure 3 is an exploded view in perspective of the improved resilient mounting of this invention;

Figure 4 is a fragmentary end view, partly broken away and partly in cross section, of a modification of the improved resilient mounting;

Figure 5 is a view along line 5—5 in Figure 4; and

Figure 6 is a view in perspective of the roller member of the modification of the invention.

Referring now to Figures 1 to 3 of the drawing, there is shown a rotating machine 1 (such as a small electric motor, for instance) having a housing member 2 secured to an end shield member 3 by threaded members 4 so as to form a housing for the machine. The end shield 3 includes a hub member 5; a bearing sleeve 6 is positioned within hub member 5 together with a suitable lubricating arrangement 7 so as to support a shaft 8 in rotatable relation to the housing. As shown, the bearing 6, together with its lubricating arrangement 7, is preferably enclosed by means of a closure member 9 snapped into the end of hub 5.

In order to isolate the torsional vibrations of machine 1 which result both directly and indirectly from the rotation of shaft 8, the improved arrangement described herebelow is provided. Hub 5 is provided with a raised central annulus 10 and two portions of lesser radius 11 and 12 located respectively on the axial sides of portion 10. Outer portion 11 is provided with a plurality of projections 13 which extend in an axial direction relative to shaft 8.

A plurality of substantially cylindrical members 14 are respectively arranged in cooperative relation with a like number of hub projections 13. Each member 14 has a center portion 15 of reduced diameter and a pair of larger portions 16 and 17 respectively at the axial ends thereof. Each outer portion 16 is provided with a recess 18, and each center portion 15 is provided with a projection 19 diametrically opposite recess 18. Either portion 16 or 17 is also provided with a diametrically extending groove 20 formed in a plane substantially perpendicular to the axis of machine 1. As appears best in Figure 3, these grooves 20 are preferably placed alternately in parts 16 and 17 of adjacent members 14. As can be seen from an examination of the figures, each member 14 seats on hub 5 so that projections 13 fit respectively within recesses 18 in portions 16; this is a relativley loose fit to allow for pivoting of part 14 with respect to hub 5 about an axis substantially parallel to the axis of machine 1. As to the remainder of part 14, the three portions 16, 15 and 17 are respectively arranged so as to be seated upon hub portions 11, 10 and 12 respectively.

An annulus 21 is formed from a sheet or strip of relatively rigid material such as metal. The annulus is formed, as shown, with its width extending substantially axially with respect to shaft 8. The annulus has a central circumferentially extending groove 22 with openings 23 formed therein. As shown in Figure 3, member 21 is not necessarily formed to be continuous although this may be done if so desired.

When each member 14 is arranged on hub 5 in the intended relation as described above, annulus 21 may be readily assembled to the other elements in spaced concentric relation with hub 5, and with the projections 19 of members 14 extending respectively through the openings 23 of the annulus which are respectively radially aligned with projections 13. Thus, each member 14 is pivotable with respect to annulus 21 on an axis substantially parallel to the axis of machine 1. Those surfaces of parts 15, 16, and 17 of member 14 which engage either hub 5 or the inner surface of annulus 21 are formed with cross sections in the form of arcs of a circle having a diameter equal to the radial distance between the hub and the annulus. With this construction, the outer surfaces of parts 16, 15, and 17 of member 14 ride on the inner surface of the annulus and on surfaces 11, 10, and 12 of hub 5 in restrained rotatable relation therewith, with projections 13 and 19 providing limiting stops on the amount of possible rotation.

The yielding restraint to rotation is provided by a member 24 which consists of a length of spring wire. Member 24 is provided with alternating straight parts 25 and curved parts 26. When assembled with the remainder of the elements of the invention, each of the four straight parts 25 is positioned within a groove 20 of a member 14 and each of the curved parts 26 extends around hub 5 between the hub and annulus 21. By providing grooves 20 alternately in portions 16 and 17 of members 14, spring member 24 is automatically retained in assembled relation. It will be observed that with the spring arranged as set forth above, it is necessary to deflect the spring for members 14 to rotate relative to hub 5 and annulus 21. In this manner, the spring qualities of member 24 are utilized to their fullest extent in response to torsional forces operating through hub 5. The effect of axial forces is substantially eliminated from the spring 24 by the axial engagement of parts 16 and 17 with hub portion 10 and annulus groove 22 which precludes yielding in response to such forces. In addition, radial forces have no effect on spring member 24 since member 14 extends radially all the way from the hub 5 to the annulus 21 so as to make the assembly unyielding in response to radial forces.

A support 27 of rigid sheet material, usually steel, is provided with an upstanding portion 28 which terminates in a curved recess 29 having a pair of latches 30 defined respectively on the sides thereof. Annulus 21 fits within recess 29 of member 27 so that the support extends into circumferential groove 22. The annulus 21 and the support 27 are secured in their relationship by suitable clamping means, such as, for instance, clamping members 31 having slots 32 which fit over the latches 30. The two clamping members 31 are secured together at their upper ends by means of a threaded member 33 which extends through the two clamping members and is provided with an internally threaded member 34 which can be tightened so as to tighten the engagement of the clamping members when they are positioned on the annulus 21, as best seen in Figure 1.

It will be observed from the foregoing that the invention provides a resilient mounting arrangement which provides a relatively high degree of torsional resilience and a relatively high degree of axial and radial stiffness entirely through the use of parts made entirely of substantially non-resilient material (compared to rubber) which may be manufactured and assembled efficiently and economically compared to previous constructions.

Referring now to Figures 4 and 5 of the drawing, a second embodiment of the invention will be described using the same numerals as used in Figures 1 to 3 for like parts. As before, a machine hub 5 is provided in concentric relation with an annulus 21 having a circumferentially extending center groove 22 provided with openings 23. In this case, hub 5 has, axially speaking, a pair of outer circumferential portions 35 and, between them, a circumferential portion 36 of relatively small radius compared to the other two so as to define a circumferentially extending groove therebetween. Portions 35 are each provided with axially extending projections 37, each projection 37 being interrupted by portion 36.

Instead of the members 14 described in Figures 1 to 3, the second embodiment of this invention provides members 38. Members 38 have a cross section which is, generally, in the form of an ellipse, preferably cut off at each end of the major axis, and with a minor axis equal to the radial distance between hub 5 and annulus 21. In an axial sense, the member 38 is divided into outer portions 40 and center portion 41. Each outer portion 40 has a recess 42 to accommodate a hub projection 37, and the center portion 41 has a projection 43 which, when assembled, fits into opening 23 of annulus 21. In the assembled relation, each of portions 40 and 41 of member 38 is in engagement with hub portions 35 and 36 respectively and with the inner surface of annulus 21 and the minor axis of the elliptical cross section of member 38 extends radially. Member 38 is in pivotable engagement with hub 5 by the engagement of hub projection 37 within recess 42, and is in pivotable engagement with annulus 21 by the engagement of projection 43 within opening 23. The outer surfaces of the member 38 are provided with an elliptical curvature and therefore will roll upon hub 5 an annulus 21 as the pivoting occurs.

Because of the elliptical cross section of each member 38, pivoting of the member relative to hub 5 and annulus 21 causes a departure in the radial direction of the machine from the minor axis of the ellipse toward the major axis. This tends to put pressure against the hub 5 and the annulus 21, the pressure increasing as the pivoting continues the major axis of the ellipse is further approached. In this manner, a yielding resistance to torsional vibrations is provided while, at the same time, it is clear that both radially and axially the mounting will have an exceedingly high degree of stiffness.

The vibration isolating effect of the embodiment of Figures 4 and 5 may be improved even further by the provision of spring 24 having straight portions 25 and curved portions 26, with each portion 25 fitting within a groove 20 as in the case of the arrangement described in Figures 1 to 3.

While this invention has been explained by describing particular embodiments thereof, many modifications will occur to those skilled in the art. For instance, while members 14 and 38 have been shown as either circular or substantially elliptical in cross section, it will be apparent that the curved configuration is important only for that much of the member which is in rolling contact with either the hub or the annulus and that the arcuate surface may be restricted to that much of the member if so desired.

Thus, it is clear that many improvements and modifications may be made without departing from the scope of the invention as defined in the appended claims.

What I claim as new and desire to secure by Letters Patent of the United States is:

1. In a machine having a rotatable member and a stationary member provided with a hub; means arranged on said hub for resiliently mounting said machine comprising an annulus of relatively rigid material positioned substantially concentric with said hub and outwardly spaced therefrom, a plurality of circumferentially spaced roller members of stiff material positioned between said hub and said annulus, each said roller member rollingly engaging both said hub and said annulus on axes substantially parallel to the axis of said machine, each said roller member having a groove extending therethrough, and spring means extending through said grooves interconnecting said roller members and opposing rolling thereof relative to said hub and said annulus.

2. In a machine having a rotatable member and a stationary member provided with a hub; means arranged on said hub for resiliently mounting said machine comprising an annulus of relatively rigid material positioned substantially concentric with said hub and outwardly spaced therefrom, a plurality of circumferentially spaced roller members of stiff material positioned between said hub and said annulus, each said roller member rollingly engaging both said hub and said annulus on axes substantially parallel to the axis of said machine, each said roller member having a groove extending therethrough in a plane substantially perpendicular to the axis of said machine, and a continuous wire spring member extending through all said grooves so as yieldingly to resist rolling of said roller members.

3. In a machine having a rotatable member and a stationary member provided with a hub; means arranged on said hub for resiliently mounting said machine comprising an annulus of relatively rigid material positioned substantially concentric with said hub and outwardly spaced therefrom, a plurality of circumferentially spaced roller members of stiff material positioned between said hub and said annulus, each said roller member rollingly engaging both said hub and said annulus on axes substantially parallel to the axis of said machine, each said roller member having portions in radial engagement with said annulus and said hub respectively thereby to preclude relative axial movement thereof, each said roller member having a groove extending therethrough, and spring means extending through said grooves interconnecting said roller members and opposing rolling thereof relative to said hub and said annulus.

4. In a machine having a rotatable member and a stationary member provided with a hub; means arranged on said hub for resiliently mounting said machine comprising an annulus of relatively rigid material positioned substantially concentric with said hub and outwardly spaced therefrom, and a plurality of circumferentially spaced roller members of stiff material positioned between said hub and said annulus, each said roller member rollingly engaging both said hub and said annulus on axes substantially parallel to the axis of said machine, each said roller member having a groove extending therethrough, and spring means extending through said grooves interconnecting said roller members, each said roller member having those of its surface portions which are rollingly engageable either with said annulus or said hub formed as arcs of a circle having a diameter equal to the radial distance between said hub and the inner surface of said annulus.

5. In a machine having a rotatable member and a stationary member provided with a hub; means arranged on said hub for resiliently mounting said machine comprising an annulus of relatively rigid material positioned substantially concentric with said hub and outwardly spaced therefrom, and a plurality of circumferentially spaced roller members of stiff material positioned between said hub and said annulus, each said roller member rollingly engaging both said hub and said annulus on axes substantially parallel to the axis of said machine, each said roller member having those of its surfaces which are rollingly engageable with said hub and said annulus formed as parts of an ellipse having a minor axis equal to the radial distance between said hub and the inner surface of said annulus, each said roller member being normally arranged with the said minor axis of said ellipse on a radius of the machine, each said roller member having a groove extending therethrough, and spring means extending through said grooves interconnecting said roller members and opposing rolling thereof relative to said hub and engaging said roller members and spring means engaging said roller members and opposing rolling thereof relative to said hub and said annulus.

References Cited in the file of this patent

UNITED STATES PATENTS

| | | |
|---|---|---|
| Re. 22,403 | Trott | Dec. 7, 1943 |
| 2,238,179 | McIntosh | Apr. 15, 1941 |
| 2,359,036 | Harper | Sept. 26, 1944 |

FOREIGN PATENTS

| | | |
|---|---|---|
| 746,966 | France | Mar. 21, 1933 |